R. J. MILLION.
SAFETY TRACTOR HITCH.
APPLICATION FILED MAY 11, 1917.
1,260,240.
Patented Mar. 19, 1918.
2 SHEETS—SHEET 1.
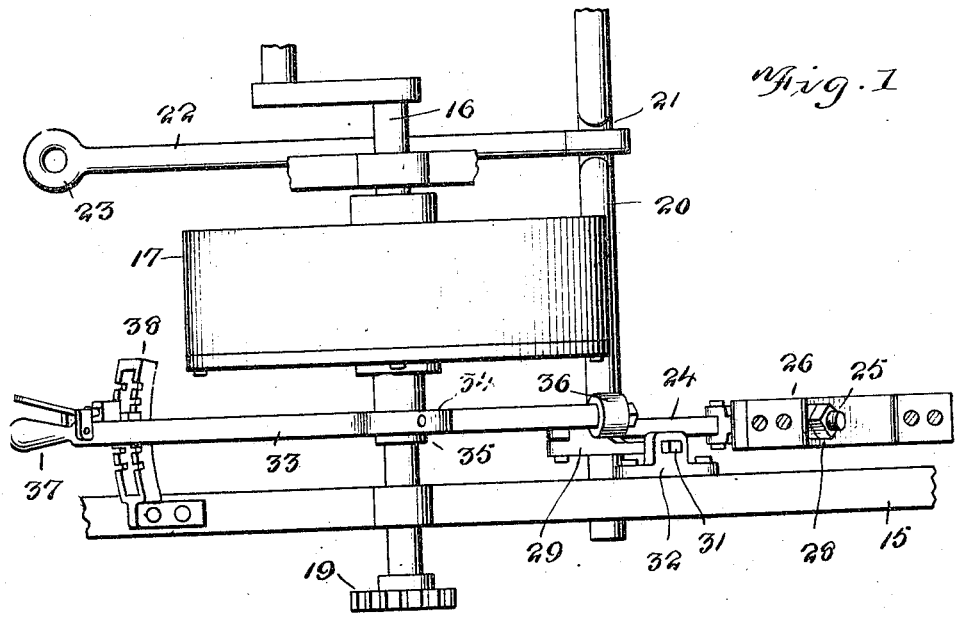
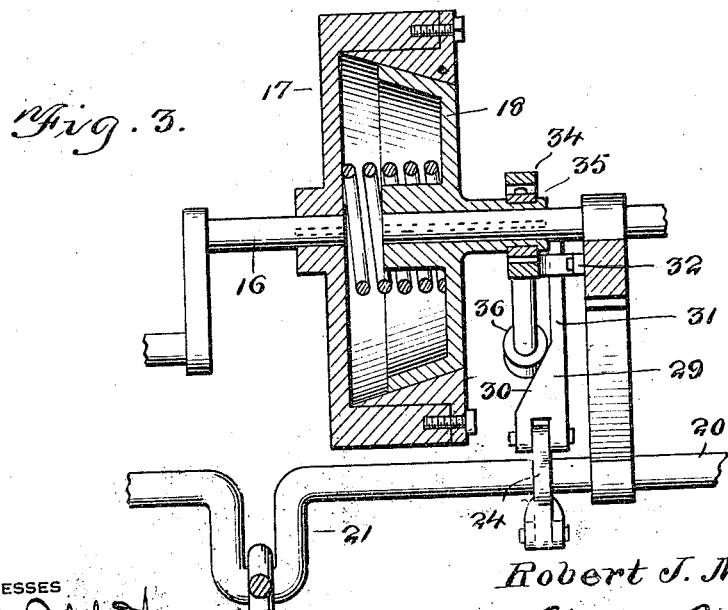
WITNESSES
E. Q. Ruppert
Eva W. Springer
INVENTOR
Robert J. Million
BY Victor J. Evans
ATTORNEY

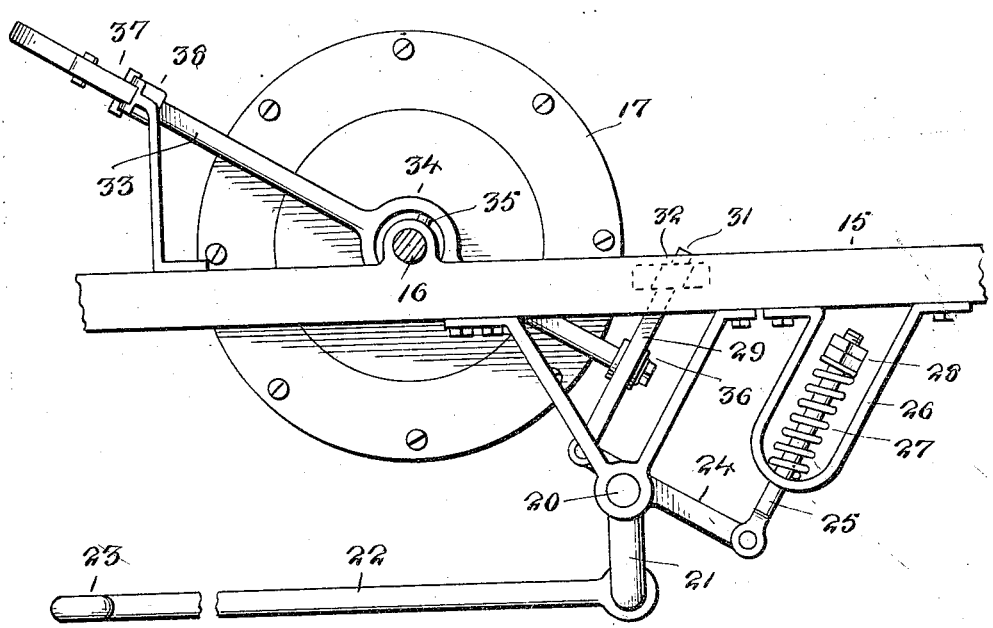
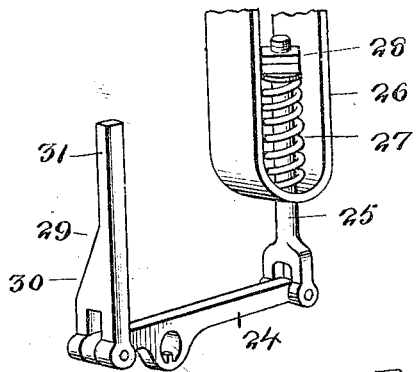

UNITED STATES PATENT OFFICE.

ROBERT J. MILLION, OF MONTICELLO, INDIANA.

SAFETY TRACTOR-HITCH.

1,260,240.

Specification of Letters Patent.   Patented Mar. 19, 1918.

Application filed May 11, 1917.   Serial No. 168,004.

*To all whom it may concern:*

Be it known that I, ROBERT J. MILLION, a citizen of the United States, residing at Monticello, in the county of White and State of Indiana, have invented new and useful Improvements in Safety Tractor-Hitches, of which the following is a specification.

This invention relates to an improved safety hitch for connecting a plow or a similar implement with a tractor.

The invention has for its object to produce a simple and effective device of improved construction whereby when the implement drawn by the tractor encounters an obstruction, the driving gear of the tractor will be instantly thrown out of action thereby automatically stopping the progress of the tractor without stopping the motor.

A further object of the invention is to produce simple and effective means whereby the driving gear of a tractor will be thrown out of gear without stopping the motor when the progress of the tractor is impeded by any unusual obstruction to the progress of the implement drawn by the tractor.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Figure 1 is a top plan view of a safety hitch device constructed in accordance with the invention.

Fig. 2 is a side elevation of the same.

Fig. 3 is a transverse sectional view.

Fig. 4 is a detail view on an enlarged scale of the releasing cam and related parts.

Corresponding parts in the several figures of the drawings are denoted by like characters of reference.

15 designates the frame of a tractor on which the improved device has been installed, it being understood that the tractor itself may be of any make or type adapted for the purposes of the invention. 16 designates the crank shaft of the motor from which motion is transmitted, by means of a friction clutch 17 including a spring actuated friction cone 18, to the driving gear 19.

Supported in suitable bearings beneath the frame of the tractor is a rock shaft 20 having a crank 21 with which the draw bar 22 is connected, said draw bar having a loop or clevis 23 for convenient connection with the draft gear of a plow or other implement, not shown. Securely keyed on the rock shaft 20 is a lever 24 one arm of which is pivotally connected with a rod 25 guided through a hanger 26 on the under side of the tractor frame, said rod having coiled thereon a spring 27 the tension of which may be regulated by a nut 28. Connected pivotally with the other arm of the lever 24 is a wedge or cam member 29 having an inclined cam face 30 and a straight extension or finger 31, the latter being guided in a keeper 32.

33 designates a lever having an eye 34 wherein is pivoted a thrust collar 35 that surrounds the motor shaft 16 and is arranged to bear against the face of the friction cone 18. Mounted on one arm of the lever 33 is an anti-friction roller 36 that abuts on the cam member 29; the other arm of the lever constitutes a handle carrying a stop member 37 that engages a notched segment 38.

The spring 27 must be of such strength that it will be compressed very slightly, if at all, by strain exerted by the draw bar 22 on the crank of the rock shaft 20 under ordinary conditions of operation. Should such stress be abnormally increased, however, as in the event of the plow or other implement encountering an obstruction, the rock shaft will be rotated, thereby compressing the spring 27 through the connection of the rod 25 with the lever 24. Th cam member connected with the other arm of the lever will engage the anti-friction roller 36 of the lever 33, forcing the latter in the direction of the friction cone which will thus be disengaged from the body portion of the clutch, thereby disengaging the driving gear of the tractor from the motor and interrupting the progress of the tractor. Should the clutch remain out of gear, the tractor should be reversed and the clutch lever 33 may now be disengaged from the notched segment 38, thus enabling the tractor to be backed free of the obstruction. The clutch lever 33 may also be utilized independently of other mechanism for the purpose of throwing the clutch out of gear, the fulcrum of the clutch lever in such event being formed by the roller 36 engaging the cam member.

While in the foregoing I have shown and described a simple and possibly preferred form of my improved hitching device, I would have it understood that no limitation is made or intended to the specific structure herein described.

Having thus described the invention, what is claimed as new is:

1. In a safety hitch for tractors, a draw bar, a rock shaft having a crank with which the draw bar is connected, a lever fixed on the rock shaft, a spring pressed rod with which one arm of the lever is connected, a motor shaft, a driving gear, a clutch connecting the motor shaft with the driving gear, a clutch actuating thrust member, and an operative connection between said actuating member and the other arm of the lever fixed on the rock shaft.

2. In a device of the class described, a motor shaft, a driving gear, a clutch connecting the motor shaft with the driving gear, and means for actuating the clutch under abnormal draft conditions, said means including a rock shaft having a crank, a draw bar connected with said crank, a lever fixed on the rock shaft, a spring pressed rod with which one arm of said lever is connected, a clutch actuating lever, and a cam member connected with and actuated by the other arm of the lever fixed on the rock shaft, one arm of the clutch actuating lever being disposed in the path of said cam member.

3. In a device of the class described, a motor shaft, a driving gear, a clutch connecting the motor shaft with the driving gear, and means for actuating the clutch under abnormal draft conditions said means including a rock shaft having a crank, a draw bar connected with said crank, a lever fixed on the rock shaft, a spring pressed rod with which one arm of said lever is connected, a clutch actuating lever, and a cam member connected with and actuated by the other arm of the lever fixed on the rock shaft, one arm of the clutch actuating lever being disposed in the path of said cam member, a stop member mounted on the other arm of the clutch actuating lever, and a notched segment engaged by said stop member.

4. In a device of the class described, a motor shaft, a driving gear, a friction clutch connecting the motor shaft with the driving gear, clutch actuating means including a lever having a thrust collar lying in engagement with the friction cone of the clutch, a notched segment, a stop member on one arm of the lever engaging the notched segment, an anti-friction roller on the other arm of said lever, a rock shaft having a crank, a draw bar connected with said crank, a lever fixed on the rock shaft, a spring pressed rod with which one arm of said lever is connected, and a cam member connected with the other arm of said lever and guided in the path of the anti-friction roller of the lever having the thrust collar.

In testimony whereof I affix my signature.

ROBERT J. MILLION.